US012772361B2

(12) United States Patent
Singvall et al.

(10) Patent No.: US 12,772,361 B2
(45) Date of Patent: Oct. 20, 2026

(54) UPDATING A DATABASE OF LIGHT SOURCES OF A LIGHTING SYSTEM

(71) Applicant: Brainlit AB, Lund (SE)

(72) Inventors: Jakob Singvall, Bjarred (SE); Tord Wingren, Lomma (SE); Frans Roselius, Svalov (SE); Bengt Lindoff, Kristianstad (SE); Truls Löwgren, Malmo (SE)

(73) Assignee: Brainlit AB, Lund (SE)

( * ) Notice: Subject to any disclaimer, the term of this patent is extended or adjusted under 35 U.S.C. 154(b) by 74 days.

(21) Appl. No.: 18/852,104

(22) PCT Filed: Mar. 27, 2023

(86) PCT No.: PCT/EP2023/057780
§ 371 (c)(1),
(2) Date: Sep. 27, 2024

(87) PCT Pub. No.: WO2023/186778
PCT Pub. Date: Oct. 5, 2023

(65) Prior Publication Data

US 2025/0212308 A1 Jun. 26, 2025

(30) Foreign Application Priority Data

Apr. 1, 2022 (EP) .................................... 22166374

(51) Int. Cl.
*H05B 47/175* (2020.01)
*H05B 47/135* (2020.01)
(Continued)

(52) U.S. Cl.
CPC ....... *H05B 47/1995* (2024.01); *H05B 47/135* (2020.01); *H05B 47/19* (2020.01); *H05B 47/20* (2020.01)

(58) Field of Classification Search
CPC .. H05B 47/1995; H05B 47/135; H05B 47/19; H05B 47/20
See application file for complete search history.

(56) References Cited

U.S. PATENT DOCUMENTS

2014/0300276 A1* 10/2014 Wang .................... H04W 4/029
315/151
2019/0313503 A1* 10/2019 Woytowitz ............. H05B 45/20
(Continued)

FOREIGN PATENT DOCUMENTS

KR 20130066609 A * 6/2013 ................ F21V 7/30

OTHER PUBLICATIONS

International Search Report from International Application No. PCT/EP2023/057780 mailed May 9, 2023.
Extended European Search Report dated Aug. 23, 2022.

*Primary Examiner* — Abdullah A Riyami
*Assistant Examiner* — Syed M Kaiser
(74) *Attorney, Agent, or Firm* — Shih IP Law Group, PLLC

(57) ABSTRACT

The present inventive concept relates to a lighting system and a method for updating a database of light sources of a lighting system, each entry of the database correlating a light source ID of a light source of the lighting system with an associated location of the light source. The method comprising: receiving a light source ID from a light source communicatively connected to the lighting system; comparing the received light source ID with entries of the database; upon the database lacking an entry corresponding to the received light source ID: requesting the light source associated with the received light source ID to initiate a change of state, monitoring for a sensor signal indicative of an occurrence of the change of state among sensor signals of light sensors distributed in locations served by the lighting system, thereby determining a location of the light source
(Continued)

associated with the received light source ID, and adding an entry to the database, the added entry correlating the received light source ID with the determined location of the light source.

12 Claims, 2 Drawing Sheets

(51) Int. Cl.
*H05B 47/19* (2020.01)
*H05B 47/20* (2020.01)

(56) References Cited

U.S. PATENT DOCUMENTS

| | | | | |
|---|---|---|---|---|
| 2020/0042006 | A1 * | 2/2020 | Jessen .................. | H05B 47/105 |
| 2020/0288558 | A1 * | 9/2020 | Anderson .............. | H05B 45/10 |
| 2020/0329341 | A1 | 10/2020 | Kuber | |

* cited by examiner

UPDATING A DATABASE OF LIGHT SOURCES OF A LIGHTING SYSTEM

TECHNICAL FIELD

The present inventive concept relates to a lighting system. The present inventive concept further relates to updating a database of light sources of a lighting system.

BACKGROUND OF THE INVENTION

Commissioning lighting system in large buildings, such as office spaces etc., is usually complex. A lot of manual tasks are typically needed in order to check the identify of each respective lighting armature and manually determine its position in the building. This makes the procedure to commission a new lighting system time consuming and can often be technically complex and therefore be associated with significant costs. Similarly, if a light source needs to be replaced, there is manual tasks involved in updating the light source identity for the replaced light source.

In modern lightning system may also come with other sensors such as wireless communication units, light sensors, as well as presence sensors. This is especially the case for lightning system in which light sources can be adjusted for optimized well-being for individual users. An example of such a system is a BioCentric Lighting™ system provided by the applicant. It would be a significant advantage if the commissioning and/or maintenance of the lighting system can be performed in a less complex and more automatic manner. Hence, there is a need for improvements in the art.

SUMMARY OF THE INVENTION

It is an object to, at least partly, mitigate, alleviate, or eliminate one or more of the above-identified deficiencies in the art and disadvantages singly or in any combination and solve at least the above-mentioned problem.

According to a first aspect a method for updating a database of light sources of a lighting system, each entry of the database correlating a light source ID of a light source of the lighting system with an associated location of the light source is provided. The method comprising: receiving a light source ID from a light source communicatively connected to the lighting system; comparing the received light source ID with entries of the database; upon the database lacking an entry corresponding to the received light source ID: requesting the light source associated with the received light source ID to initiate a change of state, monitoring for a sensor signal indicative of an occurrence of the change of state among sensor signals of light sensors distributed in locations served by the lighting system, thereby determining a location of the light source associated with the received light source ID, and adding an entry to the database, the added entry correlating the received light source ID with the determined location of the light source.

The present inventive concept thereby allows for automatic maintenance of a database of light sources of a lighting system. This is made possible since light sources of the lighting system announce their associated light source IDs, and in case a light source with that light source ID is not found in the database of light sources, the lighting system requests that such light sources initiate a state of change. A position of such a light source can then be determined as a position associated with a light sensor that detects the state of change of the light source. In this way, the positions of light sources added to the lighting system can be linked to their light source IDs in the database. The present inventive concept may be advantageous during a commissioning phase of the lighting system. For example, after installing a new light source at a new position in the lighting system, its position linked to its light source ID may be added to the database. The present inventive concept may further be advantageous during maintenance of an already commissioned lighting system. For example, in case a light source is replaced, a replacement light source will announce its presence, the position of the replacement light source linked to the light source ID can be added to the database. Since the database comprises information of which light source (via the light source ID) is installed where (i.e., their positions), the lighting system can use that updated database in order to adjust the lighting environment in a space served by the lighting system.

The method may further comprise: requesting the light source ID from the light source.

An associated advantage is that an energy usage associated with a transmission of the light source ID from the light source may be reduced.

The method may further comprise, upon lack of receipt of the requested light source ID from the light source after a predetermined number of requests and/or after a predetermined time period, and upon the database having an entry corresponding to the requested light source ID: removing the entry corresponding to the requested light source ID from the database.

An associated advantage is that light sources no longer present in the lighting system and/or light sources that no longer function may be removed from the database. This, in turn, reduces an amount of data needed to store the database.

The change of state of the light source is one or more of: an adjustment of an intensity of light emitted by the light source; and an adjustment of a correlated color temperature of light emitted by the light source.

An associated advantage is that the light source may not need any additional components (e.g., signal transmitters) in order to initiate its change of state. This may be advantageous in case the light source is an adjustable light source (i.e., capable of adjusting intensity and/or correlated color temperature of emitted light).

According to a second aspect, a control engine is provided. The control engine comprising: circuitry configured to execute: a receiving function configured to receive a light source ID from a light source communicatively connected to the control engine; a comparing function configured to compare the received light source ID with entries of a database, each entry of the database correlating a light source ID with an associated location; and wherein the circuitry is further configured to execute, upon the database lacking an entry corresponding to the received light source ID: a first requesting function configured to request the light source associated with the received light source ID to initiate a change of state, a monitoring function configured to monitor for a sensor signal indicative of an occurrence of the change of state among sensor signals of light sensors distributed in a plurality of locations, thereby determining a location of the light source associated with the received light source ID; and an adding function configured to add an entry to the database, the added entry correlating the received light source ID with the determined location of the light source.

The circuitry may be further configured to execute: a second requesting function configured to request the light source ID from the light source.

The circuitry may be further configured to execute, upon lack of receipt of the requested light source ID from the light source after a predetermined number of requests and/or after a predetermined time period, and upon the database having an entry corresponding to the requested light source ID: a removing function configured to remove the entry corresponding to the requested light source ID from the database.

The first requesting function is configured to request the change of state of the light source by being configured to: request an adjustment of a light intensity of light emitted by the light source; and/or request an adjustment of a correlated color temperature of light emitted by the light source.

The above-mentioned features of the first aspect, when applicable, apply to this second aspect as well. In order to avoid undue repetition, reference is made to the above.

According to a third aspect, a lighting system is provided. The lighting system comprising: a control engine according to the second aspect; a light source configured to communicate with the control engine and periodically and/or upon request transmit a light source ID associated with the light source to the control engine; and one or more light sensors configured to communicate with the control engine and sense a change of state of the light source.

The above-mentioned features of the first aspect and the second aspect, when applicable, apply to this third aspect as well. In order to avoid undue repetition, reference is made to the above.

According to a fourth aspect, a non-transitory computer-readable storage medium is provided. The non-transitory computer-readable storage medium comprising program code portions which, when executed on a device having processing capabilities, performs the method according to the first aspect.

The above-mentioned features of the first aspect, the second aspect, and the third aspect, when applicable, apply to this fourth aspect as well. In order to avoid undue repetition, reference is made to the above.

A further scope of applicability of the present disclosure will become apparent from the detailed description given below. However, it should be understood that the detailed description and specific examples, while indicating preferred variants of the present inventive concept, are given by way of illustration only, since various changes and modifications within the scope of the inventive concept will become apparent to those skilled in the art from this detailed description.

Hence, it is to be understood that this inventive concept is not limited to the particular steps of the methods described or component parts of the systems described as such method and system may vary. It is also to be understood that the terminology used herein is for purpose of describing particular embodiments only and is not intended to be limiting. It must be noted that, as used in the specification and the appended claim, the articles “a”, “an”, “the”, and “said” are intended to mean that there are one or more of the elements unless the context clearly dictates otherwise. Thus, for example, reference to “a unit” or “the unit” may include several devices, and the like. Furthermore, the words “comprising”, “including”, “containing” and similar wordings do not exclude other elements or steps.

BRIEF DESCRIPTION OF THE DRAWINGS

The above and other aspects of the present inventive concept will now be described in more detail, with reference to appended drawings showing variants of the inventive concept. The figures should not be considered limiting the inventive concept to the specific variant; instead they are used for explaining and understanding the inventive concept. As illustrated in the figures, the sizes of layers and regions are exaggerated for illustrative purposes and, thus, are provided to illustrate the general structures of variants of the present inventive concept. Like reference numerals refer to like elements throughout.

DETAILED DESCRIPTION

The present inventive concept will now be described more fully hereinafter with reference to the accompanying drawings, in which currently preferred variants of the inventive concept are shown. This inventive concept may, however, be implemented in many different forms and should not be construed as limited to the variants set forth herein; rather, these variants are provided for thoroughness and completeness, and fully convey the scope of the present inventive concept to the skilled person.

Figure 1:
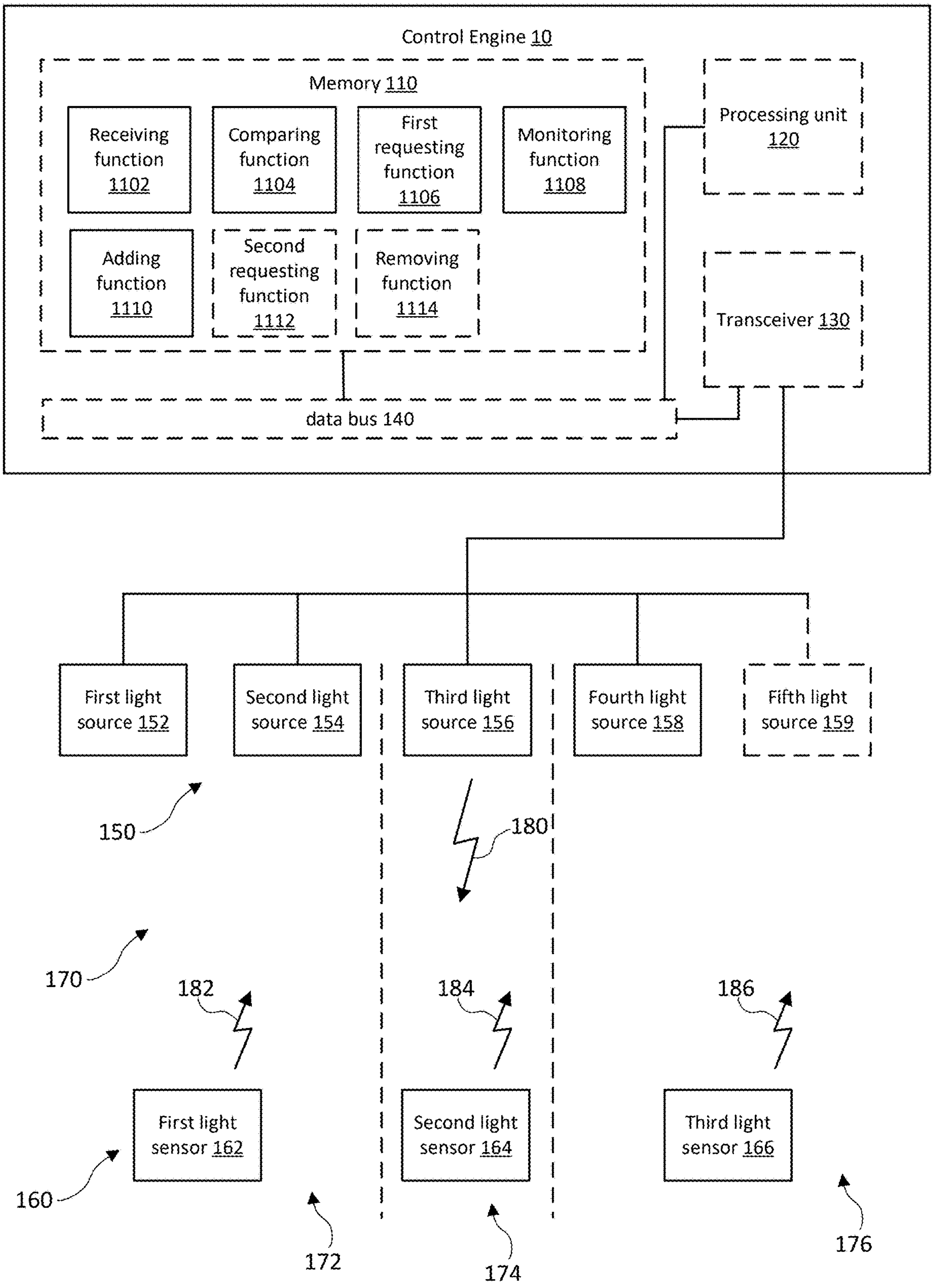
FIG. 1 illustrates a lighting system.

FIG. 1 illustrates a lighting system 1 comprising a control engine 10, a plurality of light sources 150, and a plurality of light sensors 160. It is to be understood that the number of light sources and light sensors illustrated in FIG. 1 are examples only, and those numbers may vary.

As is illustrated in the example of FIG. 1, each light source 152, 154, 156, 158 of the plurality of light sources 150 may be configured to illuminate a portion 172, 174, 176 of a space 170. The space 170 may be a room. The space 170 may be a plurality of rooms. A portion of the space 170 may be a room of the plurality of rooms. The portion of the space 170 may be a portion of a room. A location of a light source may be a room in which the light source is arranged. A location of a light source may be a portion of a room in which the light source is arranged. The plurality light sources 150 may, as illustrated in the example of FIG. 1, be arranged in a ceiling of the space 170. However, it is to be understood that one or more light sources of the plurality of light sources 150 of the lighting system may be arranged at a wall, or on the floor (e.g., as a lamp). In the example of FIG. 1, a first light source 152 and a second light source 154 are configured to illuminate a first portion 172 of the space 170, a third light source 156 is configured to illuminate a second portion 174 of the space 170, and a fourth light source 158 is configured to illuminate a third portion 176 of the space 170. A fifth light source 159 has previously been arranged in the third portion 176 of the space 170. However, the fifth light source 159 malfunctioned and is no longer communicatively connected to the control engine 10. Each light source of the plurality of light sources 150 may be an adjustable light source. An adjustable light source may be adjustable in that an intensity and/or a correlated color temperature of light emitted by the light source is adjustable. Each light source of the plurality of light sources 150 is configured to communicate with the control engine 10 and periodically and/or upon request transmit a light source ID associated with the light source to the control engine 10. In this context, “light source ID” should be construed as a unique identifier associated with a light source. Examples of such unique identifiers may be a serial number, a name, an alphanumeric code, a token, etc. Each light source of the plurality of light sources 150 may comprise a transceiver. In such case, the light source ID may be a media access control (MAC) address of the transceiver of the light source. A transceiver of a light source may be configured to communicate with the control engine 10 via a wired connection (as in the example illustrated in FIG. 1) or via a wireless connection. Examples of suitable wired connections comprise Ethernet, USB, Firewire, Power-line communication (PLC), etc. Examples of suitable wireless connections comprise Wi-Fi™, Bluetooth™, cellular data (2G, 3G, 4G, 5G, 6G, etc.), etc. In the example of FIG. 1, the plurality of light sources 150 are communicatively connected to the control engine 10 via the wired connection. In this specific example, the wired connection is a PLC connection. The transceiver of a light source may be configured to transmit a signal comprising information pertaining to the light source ID associated with the light source. By being configured to periodically transmit the light source ID, each light source of the plurality of light sources 150 may be configured to transmit its associated light source ID at a predetermined time interval. The predetermined time interval may be a number of seconds, minutes, hours, or days. For instance, each light source of the plurality of light sources 150 may be configured to transmit its associated light source ID each hour to the control engine 10. By being configured to transmit the light source ID upon request, each light source of the plurality of light sources 150 may be configured to transmit its associated light source ID in response to receiving a request signal from the control engine 10.

As is illustrated in the example of FIG. 1, the plurality of light sensors 160 are arranged in the space 170. Put differently, the plurality of light sensors 160 are distributed in locations served by the lighting system 1. Each light sensor of the plurality of light sensors 160 may be associated with a location within the space 170. The location associated with a light sensor may, e.g., be which portion of the space 170 the light sensor is arranged in. For instance, the location of the first light sensor 162 in FIG. 1 may be the first portion 172 of the space 170. In this specific example, each portion 172, 174, 176 of the space 170 comprises a single light sensor 162, 164, 166 of the plurality of light sensors 160. This, however, is to be understood as an example only, and the number of light sensors in each portion 172, 174, 176 of the space 170 may vary. Each light sensor is configured to communicate with the control engine 10 and sense a change of state of one or more of the light sources. The change of state of a light source may be one or more of an adjustment of an intensity of light emitted by the light source, an adjustment of a correlated color temperature of light emitted by the light source.

One or more light sources of the plurality of light sources 150 may further comprise a transmitter configured to broadcast a short-range communication signal. The short-range communication signal may be one or more of a near-field communication (NFC) signal, a Bluetooth™, Wi-Fi™, Zigbee, Li-Fi, etc.

Each light sensor of the plurality of light sensors 160 may be configured to communicate with the control engine 10 via a wired connection and/or a wireless connection. Examples of suitable wired connections comprise USB, Ethernet, Firewire, etc. Examples of suitable wireless connections comprise NFC, Wi-Fi™, Bluetooth™, Zigbee, Li-Fi, etc. In the example of FIG. 1, each light sensor of the plurality of light sensors 160 is configured to communicate with the control engine 10 via a Wi-Fi™ connection (represented by arrows 182, 184, 186).

As is illustrated in the example of FIG. 1, the control engine 10 comprises circuitry 100. As is further illustrated in the example of FIG. 1, the control engine 10 may further comprise one or more of a memory 110, a processing unit 120, a transceiver 130, and a data bus 140. Even though not explicitly illustrated in FIG. 1, the control server 10 may comprise input devices such as one or more of a keyboard, a mouse, and a touchscreen. The control engine 10 may, as illustrated in the example of FIG. 1, be arranged locally, i.e., in the vicinity of the space 170. Alternatively, or additionally, the control engine 10 may be implemented as a cloud server. The processing unit 120 may comprise one or more of a central processing unit (CPU), a microcontroller, and a microprocessor. The memory 110 may comprise a non-transitory computer-readable storage medium. The memory 110 may comprise one or more of a buffer, a flash memory, a hard drive, a removable media, a volatile memory, a non-volatile memory, a random-access memory (RAM), or another suitable device. In a typical arrangement, the memory 110 may comprise a non-volatile memory for long term data storage and a volatile memory that functions as system memory for the control engine 10. The memory 110, the processing unit 120, and the transceiver 130 may be configured to communicate via the data bus 140. The memory 110 may exchange data with the processing unit 120 and/or the transceiver 130 via the data bus 140. The transceiver 130 may be configured to communicate with other devices. The transceiver 130 may be configured to transmit data and/or signals from the circuitry 100 and/or the control server 10. The transceiver 130 may be configured to receive data and/or signals. Put differently, the circuitry 100 may be configured to transmit and receive data and/or signals via the transceiver 130. As is illustrated in the example of FIG. 1, the plurality of light sources 150 may communicate with one or more of the memory 110, the processing unit 120, and the transceiver 130 via the data bus 140. Alternatively, or additionally, the plurality of light sources 150 may communicate with the memory 110 and/or processing unit 120 via the transceiver 130. The circuitry 100 may be configured to perform one or more functions of the control engine 10. As is illustrated in FIG. 1, the memory 110 may store one or more program code portions 1102, 1104, 1106, 1108, 1110, 1112, 1114 corresponding to one or more functions. The processing unit 120 may be configured to execute one or more program code portions 1102, 1104, 1106, 1108, 1110, 1112, 1114 stored on the memory 110, in order to carry out functions and/or operations of the control engine. The circuitry 100 is configured to execute a receiving function 1102 and a comparing function 1104. The circuitry 100 may be further configured to execute a second requesting function 1112. Functions and/or operations of the circuitry 100 may be implemented in the form of executable logic routines (e.g., lines of code, software programs, etc.) that are stored on the memory 110 and may be executed by the processing unit 120. Put differently, when it is stated that the circuitry 100 is configured to execute a specific function, the processing unit 120 of the circuitry 100 may be configured to execute one or more program code portions stored on the memory 110, wherein the one or more program code portions correspond to the specific function. Furthermore, the functions and/or operations of the circuitry may be a stand-alone software application or form a part of a software application that carries out additional tasks related to the circuitry. The described functions and operations may be considered a method that the corresponding device is configured to carry out, such as the method 20 discussed below in connection with FIG. 2. Also, while the described functions and operations may be implemented in software, such functionality may as well be carried out via dedicated hardware or firmware, or some combination of one or more of hardware, firmware, and software.

The receiving function 1102 is configured to receive a light source ID from a light source of the plurality of light sources 150 communicatively connected to the control engine 10. The receiving function 1102 may be configured to receive the light source ID from a light source via the transceiver 130 of the circuitry 100. The connection between the plurality of light sources 150 and the transceiver 130 may, as illustrated in the example of FIG. 1, be a wired connection. However, it is to be understood that the connection may, in addition or alternatively, be wireless. Examples of suitable wired and wireless connections are given above. The receiving function 1102 may be configured to receive a respective light source ID from each light source of the plurality of light sources 150.

The second requesting function 1112 may be configured to request the light source ID from the light source. The second requesting function 1112 may be configured to request the light source ID from one or more light sources of the plurality of light sources 150. The second requesting function 1112 may be configured to request the light source ID from a light source being associated with a light source ID having entry in the database. Put differently, the second requesting function 1112 may be configured to request the light source ID from a light source having a known light source ID. This may be seen as the second requesting function 1112 checking whether the light source associated with the requested light source ID is functional or not. The second requesting function 1112 may be configured to request light source IDs from all light sources communicatively connected to the control engine 10. By requesting the light source ID from a light source, the status of a light source may be determined upon request. This may, in turn, allow for a more adaptable and rapid process for polling the status of each light source of the plurality of light sources 150. For instance, the control engine 10 may request light source IDs from the plurality of light sources 150 in response to detecting abnormalities in the lighting system 1. Such abnormalities may be a higher and/or lower energy usage than expected. In such case, the control engine 10 may request the light sources to transmit their respective light source ID to the control engine 10, which then can determine whether any light sources are malfunctioning (e.g., by not reporting their light source IDs) or has been replaced. Further, by requesting the light source ID from each light source of the plurality of light sources 150, an energy usage associated with a transmission of the light source ID from the light sources may be reduced. This, since each light source then does not need to periodically transmit its light source ID, whereby the energy usage associated with the transmission of associated light source IDs may be reduced.

The comparing function 1104 is configured to compare the received light source ID with entries of a database. The comparing function 1104 may be configured to compare light source ID received from each light source of the plurality of light sources 150 with entries of the database. Each entry of the database correlates a light source ID with an associated location. The database may be an existing database. One or more entries of the database may correlate further information to the light source ID. Examples of such further information comprises one or more of energy usage, allowable settings of the associated light source (i.e., which intensities and/or correlated color temperatures of light that the associated light source is capable of emitting), date of installation, etc. The further information may be added manually and/or transmitted by the associated light source. For instance, the date of installation may be the date at which the entry was added to the database.

The circuitry 100 may be configured to execute, upon the database having an entry corresponding to the received light source ID, the receiving function 1102 again. Put differently, in case the received light source ID is already associated with an entry of the database, the receiving function 1102 may be executed and thereby receive a light source ID associated with a different light source. The first light source 152 illustrated in the example of FIG. 1 has a light source ID which has an entry in the database associated with the light source ID of the first light source 152. The comparing function 1104 then determines that the light source ID of the first light source 152 is associated with an entry in the database. Upon this determination, the circuitry 100 may execute the receiving function 1102 in order to receive a light source ID associated with one of the other light sources of the lighting system 1, e.g., the second light source 154.

The circuitry 100 is further configured to execute, upon the database lacking an entry corresponding to the received light source ID, a first requesting function 1106, a monitoring function 1108, and an adding function 1110. Put differently, if the received light source ID is not associated with an entry of the database, the circuitry 100 is configured to execute the first requesting function 1106, the monitoring function 1108, and the adding function 1110.

The first requesting function 1106 is configured to request the light source associated with the received light source ID to initiate a change of state. The first requesting function 1106 may be configured to request the change of state of the light source by being configured to request an adjustment of a light intensity of light emitted by the light source, and/or request an adjustment of a correlated color temperature of light emitted by the light source. For example, the first requesting function 1106 may be configured to request a light source to increase and/or decrease the intensity of light emitted by the light source. In case the light source is an adjustable light source (i.e., being able to adjust its correlated color temperature and/or its intensity), the light source may change its state without the light source needing any additional dedicated components (e.g., signal transmitters).

The monitoring function 1108 is configured to monitor for a sensor signal indicative of an occurrence of the change of state among sensor signals of the plurality of light sensors 160 distributed in a plurality of locations, thereby determining a location of the light source associated with the received light source ID. Thus, one or more light sensors of the plurality of light sensors 160 detects the change of state of the light source, and the location of the light source is determined by monitoring the sensor signals from the one or more light sensors. The location of the light source may, e.g., be which portion of the space in which the light source is arranged. The determined location of the light source may be a location associated with the light sensor sensing the change of state of the light source. For instance, in case the third light source 156 in FIG. 1 changes its state, the second light sensor 162 senses that change of state, e.g., by sensing a variation in intensity and/or correlated color temperature of light emitted (represented by arrow 180) by the third light source 156. By monitoring the sensor signal of the second light sensor 162, an indication of the occurrence of a state of change in the second portion 174 of the space 170 may be sensed. Then, the location of the third light source 156 may be determined as the location of the second light sensor 162. Hence, by knowing the location of each light sensor of the plurality of light sensors 160, the location of a light source requested to change its state may be determined by finding a light sensor for which a sensor signal is indicative of that change of state. Depending on the type of short-range communication signal, the accuracy of the determined location of the light source relative to a light sensor may vary. For example, a signal level of the short-range communication detected by a light sensor may be indicative of a relative distance between the light source and the light sensor.

The adding function 1110 is configured to add an entry to the database. The added entry correlates the received light source ID with the determined location of the light source. The present lighting system thereby allows for automatic maintenance of the database of light sources of the lighting system 1. In this way, the locations of light sources added to the lighting system 1 can be linked to their light source IDs in the database. This may further be advantageous during a commissioning phase of the lighting system 1. For example, after installing the lighting system 1 in the space 170, the lighting system 1 may automatically request the plurality of light sources 150 to change their states. Upon adding the first entry (e.g., an entry correlating the light source ID of the first light source 152 with a determined location of the first light source 152) to the database, the database may be created. Further, after installing a new light source at a new position in the lighting system 1 (e.g., when expanding the lighting system with new light sources), an entry correlating the location of the new light source and its associated light source ID may be added to the database. The lighting system 1 may further be advantageous during maintenance after being commissioned. For example, in case a light source is replaced, a replacement light source will announce its presence (e.g., by transmitting its light source ID periodically), the position of the replacement light source linked to the light source ID can be added to the database. Since the database comprises information of which light source (via the light source ID) is installed where (i.e., their locations), the lighting system 1 can use that updated database in order to adjust the lighting environment of the space 170 (i.e., the locations) served by the lighting system 1. In the example of FIG. 1, an entry correlating the light source ID of the third light source 156 and the second portion 174 (i.e., the location of the third light source 156) is added to the database.

The circuitry 100 may be further configured to execute, upon lack of receipt of the requested light source ID from the light source after a predetermined number of requests and/or after a predetermined time period, and upon the database having an entry corresponding to the requested light source ID, a removing function configured to remove the entry corresponding to the requested light source ID from the database. Put differently, light sources no longer present in the lighting system 1 and/or light sources that no longer function may be removed from the database. This, in turn, reduces an amount of data needed to store the database. This is illustrated in the example of FIG. 1 by the fifth light source 159. The database of the lighting system 1 of FIG. 1 comprises an entry correlating the fifth light source 159 with the third room 176 (i.e., the location of the fifth light source 159). However, the receiving function 1102 of the circuitry 100 has not received the light source ID associated with the fifth light source 159 for an amount of time (e.g., a few minutes, hours, days, weeks, months, etc.), and thereby executes the second requesting function 1112. Since the fifth light source 159 is not operational (e.g., removed or not functional), the circuitry 100 does not receive the requested light source ID associated with the fifth light source 159. After the predetermined number of requests (i.e., requests from the second requesting function) and/or after the predetermined time period, the entry corresponding to the light source ID associated with the fifth light source 159 is removed from the database. In case the removed entry is associated with the same location as a recently added entry, the recently added entry may be associated with a replacement light source. For instance, in case the fifth light source 159 is replaced by a sixth light source (not illustrated) in the example of FIG. 1, the determined location of the sixth light source will be the same as the location previously correlated with the light source ID of the fifth light source 159. Put differently, the location determined for the sixth light source would then be the third portion 176 of the space 170. Hence, the sixth light source may thereby be a replacement light source for the fifth light source 159.

Figure 2:
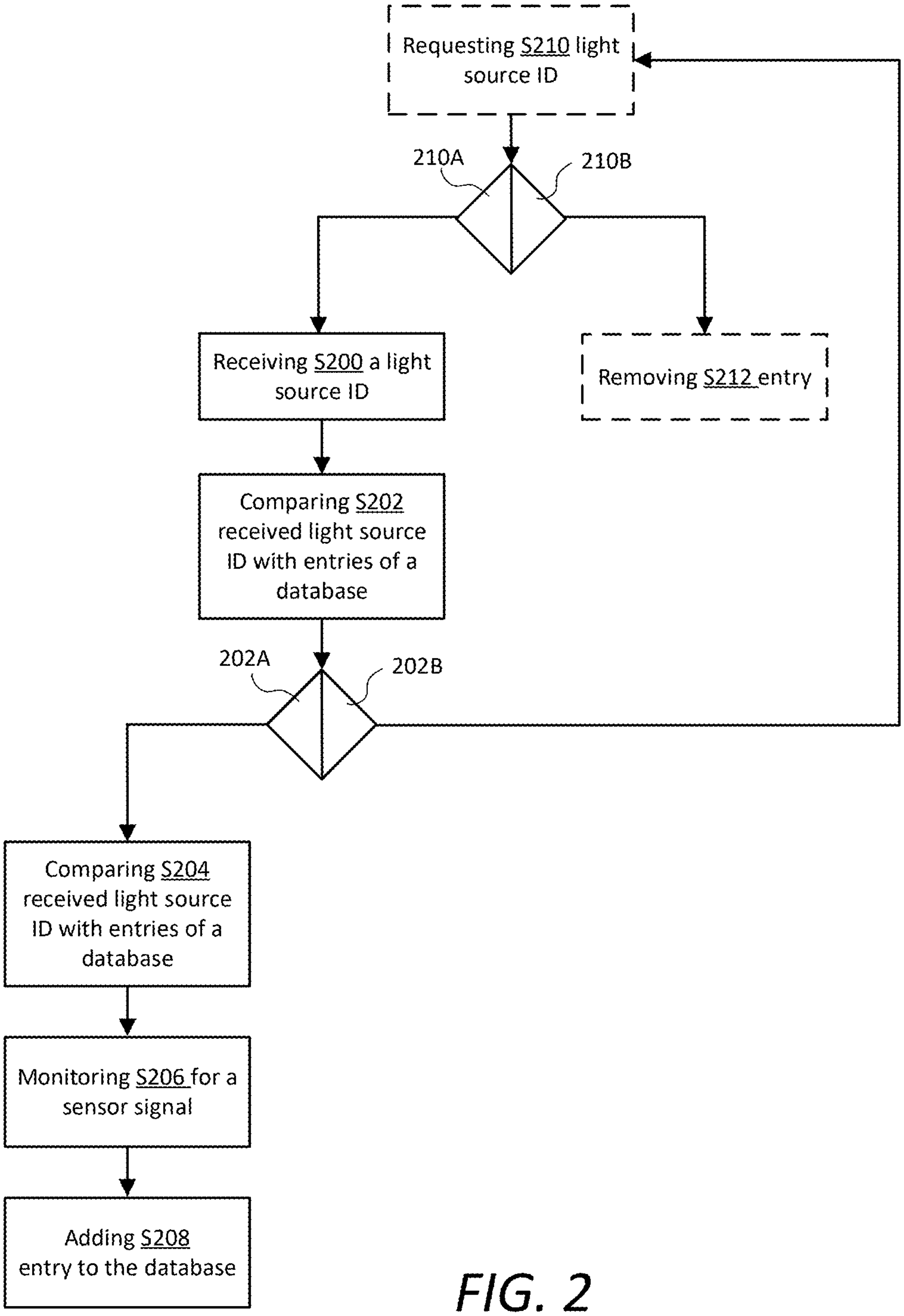
FIG. 2 is a block scheme of a method for updating a database of light sources of a lighting system.

FIG. 2 is a block scheme of a method 20 for updating a database of light sources of a lighting system 1, each entry of the database correlating a light source ID of a light source of the lighting system 1 with an associated location of the light source. The method 20 may be a computer-implemented method. The method 20 comprises receiving S200 a light source ID from a light source communicatively connected to the lighting system 1. The method 20 may comprise requesting S210 the light source ID from the light source. In such case, the act of receiving S200 a light source ID from a light source communicatively connected to the lighting system 1 may be performed upon 210A receipt of the requested light source ID. In case the requested light source ID is not received, the act of requesting S210 the light source ID from the light source may be repeated a predetermined number of times (e.g., 10-20 times) and/or for a predetermined time period (e.g., a number of minutes, hours, days, weeks, etc.). Put differently, the act of requesting S210 the light source ID from the light source may be repeated for a predetermined number of requests and/or for a predetermined time period. The method 20 further comprises comparing S202 the received light source ID with entries of the database. The method 20 further comprises, upon the database lacking 202A an entry corresponding to the received light source ID, requesting S204 the light source associated with the received light source ID to initiate a change of state, monitoring S206 for a sensor signal indicative of an occurrence of the change of state among sensor signals of light sensors distributed in locations served by the lighting system 1, thereby determining a location of the light source associated with the received light source ID, and adding S208 an entry to the database, the added entry correlating the received light source ID with the determined location of the light source. The change of state of the light source may be one or more of an adjustment of an intensity of light emitted by the light source; and an adjustment of a correlated color temperature of light emitted by the light source. The method 20 may further comprise, upon 202B the database having an entry corresponding to the received light source ID, repeating the method 20. The method 20 may be repeated after a time period, e.g., a few minutes, hours, and/or days. The method 20 may further comprise, upon 210B lack of receipt of the requested light source ID from the light source after a predetermined number of requests and/or after a predetermined time period, and upon the database having an entry corresponding to the requested light source ID, removing S212 the entry corresponding to the requested light source ID from the database.

Figure 3:
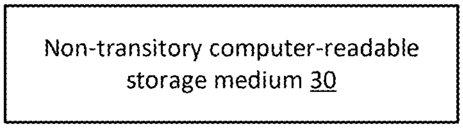
FIG. 3 is a non-transitory computer-readable storage medium.

FIG. 3 illustrates a non-transitory computer-readable storage medium 30. The non-transitory computer-readable storage medium 30 comprising program code portions which, when executed on a device having processing capabilities, performs the method illustrated in FIG. 3. The device having processing capabilities may further comprise a transceiver configured to communicate with light sources of the lighting system and/or light sensors distributed in locations served by the lighting system.

The person skilled in the art realizes that the present inventive concept by no means is limited to the preferred variants described above. On the contrary, many modifications and variations are possible within the scope of the appended claims.

For example, in FIG. 1, a single light sensor is arranged in each location of the space (i.e., each portion of the space). It is however to be understood that more than one light sensor may be arranged in a location. This may be advantageous, since the determination of the location of a light source may be more accurate in case more than one light sensor is used to determine the location. For instance, a more specific location of the light source may be determined. By using more than one light sensor in a location, the position of a light source within a portion of the space may be determined. For example, a position of a light source within a room may be determined by using more than one light sensor, e.g., using triangulation.

In an alternative embodiment, the first requesting function may be configured to request the change of state of the light source by being configured to request an initiation of a broadcast of a short-range communication signal from the light source. Examples of suitable short-range communication signals comprises: Bluetooth™, Wi-Fi™, Zigbee, NFC, etc. In such case the light sensor is configured to sense such a broadcast of a short-range communication signal from the light source. The location of the light source may be determined with higher accuracy in case a direction from the light sensor towards the light source may be determined from the short-range communication signal. This may be the case in case the short-range communication signal is one or more of a Bluetooth™ signal, a mmWave-Wi-Fi signal, WiGig signal, etc. For such signals, the AoA and/or AoD may be determined, whereby the direction of the short-range communication signal may be determined. Alternatively, the location of the light source may be determined via triangulation. For instance, relative signal levels detected by one or more light sensors may be compared, and thereby determine the position of the light source relative to the one or more light sensors.

Additionally, variations to the disclosed variants can be understood and effected by the skilled person in practicing the claimed invention, from a study of the drawings, the disclosure, and the appended claims.

The invention claimed is:

1. A method for updating a database of light sources of a lighting system, each entry of the database correlating a light source ID of a light source of the lighting system with an associated location of the light source, the method comprising:

receiving a light source ID from a light source communicatively connected to the lighting system;

comparing the received light source ID with entries of the database;

upon the database lacking an entry corresponding to the received light source ID:

requesting the light source associated with the received light source ID to initiate a change of state, wherein the change of state of the light source is one or more of:

an adjustment of an intensity of light emitted by the light source, and an adjustment of a correlated color temperature of light emitted by the light source, monitoring for a sensor signal indicative of an occurrence of the change of state among sensor signals of light sensors distributed in locations served by the lighting system, thereby determining a location of the light source associated with the received light source ID, and adding an entry to the database, the added entry correlating the received light source ID with the determined location of the light source.

2. The method according to claim 1, further comprising: requesting the light source ID from the light source.

3. The method according to claim 2, further comprising, upon lack of receipt of the light source ID from the light source after a predetermined number of requests and upon the database having an entry corresponding to the light source ID:

removing the entry corresponding to the light source ID from the database.

4. The method according to claim 2, further comprising, upon lack of receipt of the light source ID from the light source after a predetermined time period, and upon the database having an entry corresponding to the light source ID:

removing the entry corresponding to the light source ID from the database.

5. A control engine comprising:

circuitry configured to execute:

a receiving function configured to receive a light source ID from a light source communicatively connected to the control engine;

a comparing function configured to compare the received light source ID with entries of a database, each entry of the database correlating a light source ID with an associated location; and wherein the circuitry is further configured to execute, upon the database lacking an entry corresponding to the received light source ID:

a first requesting function configured to request the light source associated with the received light source ID to initiate a change of state, wherein the first requesting function is configured to request the change of state of the light source by being configured to:

request an adjustment of a correlated color temperature of light emitted by the light source;

a monitoring function configured to monitor for a sensor signal indicative of an occurrence of the change of state among sensor signals of light sensors distributed in a plurality of locations, thereby determining a location of the light source associated with the received light source ID; and an adding function configured to add an entry to the database, the added entry correlating the received light source ID with the determined location of the light source.

6. The control engine according to claim 5, wherein the circuitry is further configured to execute:

a second requesting function configured to request the light source ID from the light source.

7. The control engine according to claim 6, wherein the circuitry is further configured to execute, upon lack of receipt of the light source ID from the light source after a predetermined number of requests and upon the database having an entry corresponding to the light source ID:

a removing function configured to remove the entry corresponding to the light source ID from the database.

8. The control engine according to claim 6, wherein the circuitry is further configured to execute, upon lack of receipt of the light source ID from the light source after a predetermined time period and upon the database having an entry corresponding to the light source ID:

a removing function configured to remove the entry corresponding to the light source ID from the database.

9. A control engine comprising:

circuitry configured to execute:

a receiving function configured to receive a light source ID from a light source communicatively connected to the control engine;

a comparing function configured to compare the received light source ID with entries of a database, each entry of the database correlating a light source ID with an associated location; and wherein the circuitry is further configured to execute, upon the database lacking an entry corresponding to the received light source ID:

a first requesting function configured to request the light source associated with the received light source ID to initiate a change of state, wherein the first requesting function is configured to request the change of state of the light source by being configured to request an adjustment of a light intensity of light emitted by the light source;

a monitoring function configured to monitor for a sensor signal indicative of an occurrence of the change of state among sensor signals of light sensors distributed in a plurality of locations, thereby determining a location of the light source associated with the received light source ID; and an adding function configured to add an entry to the database, the added entry correlating the received light source ID with the determined location of the light source.

10. The control engine according to claim 9, wherein the circuitry is further configured to execute:

a second requesting function configured to request the light source ID from the light source.

11. The control engine according to claim 10, wherein the circuitry is further configured to execute, upon lack of receipt of the requested light source ID from the light source after a predetermined number of requests and upon the database having an entry corresponding to the light source ID:

a removing function configured to remove the entry corresponding to the light source ID from the database.

12. The control engine according to claim 10, wherein the circuitry is further configured to execute, upon lack of receipt of the light source ID from the light source after a predetermined time period and upon the database having an entry corresponding to the light source ID:

a removing function configured to remove the entry corresponding to the light source ID from the database.

* * * * *